(12) United States Patent
Bihannic

(10) Patent No.: US 10,549,434 B2
(45) Date of Patent: Feb. 4, 2020

(54) POD REPAIR UNIT

(71) Applicant: THALES, Courbevoie (FR)

(72) Inventor: Didier Bihannic, Elancourt (FR)

(73) Assignee: THALES, Courbevoie (FR)

( * ) Notice: Subject to any disclaimer, the term of this patent is extended or adjusted under 35 U.S.C. 154(b) by 205 days.

(21) Appl. No.: 15/509,050

(22) PCT Filed: Sep. 8, 2015

(86) PCT No.: PCT/EP2015/070500
§ 371 (c)(1),
(2) Date: Mar. 6, 2017

(87) PCT Pub. No.: WO2016/038037
PCT Pub. Date: Mar. 17, 2016

(65) Prior Publication Data
US 2017/0259438 A1   Sep. 14, 2017

(30) Foreign Application Priority Data
Sep. 8, 2014   (FR) ...................... 14 02015

(51) Int. Cl.
*B25J 21/02*   (2006.01)
(52) U.S. Cl.
CPC .................... *B25J 21/02* (2013.01)
(58) Field of Classification Search
CPC .............. B25J 21/02; F41G 3/145; F41G 3/32
USPC ........................................................ 454/187
See application file for complete search history.

(56) References Cited

U.S. PATENT DOCUMENTS

| 2,786,740 A | * | 3/1957 | Taylor ............... B25J 21/02 312/1 |
| 3,907,389 A | | 9/1975 | Cox et al. |
| 4,928,348 A | | 5/1990 | Clayton |
| 4,949,863 A | | 8/1990 | Cazalis et al. |
| 5,316,541 A | * | 5/1994 | Fischer ............... A61G 10/005 128/849 |
| 5,685,771 A | | 11/1997 | Kleppen |

(Continued)

FOREIGN PATENT DOCUMENTS

| DE | 851 240 C | 10/1952 |
| DE | 195 36 373 C1 | 12/1996 |

(Continued)

OTHER PUBLICATIONS

International Search Report, dated Nov. 20, 2015, from corresponding PCT application.

*Primary Examiner* — Gregory L Huson
*Assistant Examiner* — Dana K Tighe
(74) *Attorney, Agent, or Firm* — Young & Thompson

(57) ABSTRACT

Disclosed is a repair unit (10) for a pod (11), especially a laser designation pod, including: a transportable casing (14); a bubble (18) attached to the casing (14), having a retracted state and a deployed state, the bubble (18) including an opening (46) for inserting part of a pod (11) and at least two projections forming tubes (50) for the hands of an operator, each tube (50) opening up in the bubble (18); and a gas supply device (22) for switching the bubble (18) front the retracted state to the deployed state. The casing (14) and the bubble (18) define an inner space sealed from outside pollutants in both the retracted state and in the deployed state.

14 Claims, 1 Drawing Sheet

(56) References Cited

U.S. PATENT DOCUMENTS

| | | | | |
|---|---|---|---|---|
| 6,418,932 B2* | 7/2002 | Paschal, Jr. | ........... | A61G 10/005 |
| | | | | 128/845 |
| 6,508,850 B1* | 1/2003 | Kotliar | ................. | A61G 10/005 |
| | | | | 55/385.2 |
| 6,793,617 B2* | 9/2004 | Ford | ..................... | B08B 15/026 |
| | | | | 128/847 |
| 7,077,486 B2* | 7/2006 | Tattershall | ................ | B01L 1/50 |
| | | | | 312/1 |
| 2002/0105251 A1 | 8/2002 | Kensey | | |
| 2012/0031042 A1* | 2/2012 | Zambaux | ................ | B25J 21/02 |
| | | | | 53/167 |
| 2012/0247069 A1 | 10/2012 | Nagata | | |

FOREIGN PATENT DOCUMENTS

| | | |
|---|---|---|
| EP | 2 767 338 A2 | 8/2014 |
| FR | 2 254 409 A1 | 7/1975 |
| FR | 2 611 568 A1 | 9/1988 |
| GB | 2 306 376 A | 5/1997 |
| JP | S45-15672 | 6/1970 |
| JP | S46-37516 | 12/1971 |
| JP | S52-47592 | 4/1977 |
| JP | H02-57000 | 4/1990 |
| JP | 2 857209 B2 | 2/1999 |
| JP | 2008-157477 | 7/2008 |
| JP | 2008-232541 | 10/2008 |
| JP | 2010-023309 | 2/2010 |
| JP | 2010-161931 | 7/2010 |
| JP | 2012-208158 | 10/2012 |
| JP | 2013-086183 | 5/2013 |
| WO | 00/19042 A1 | 4/2000 |

\* cited by examiner

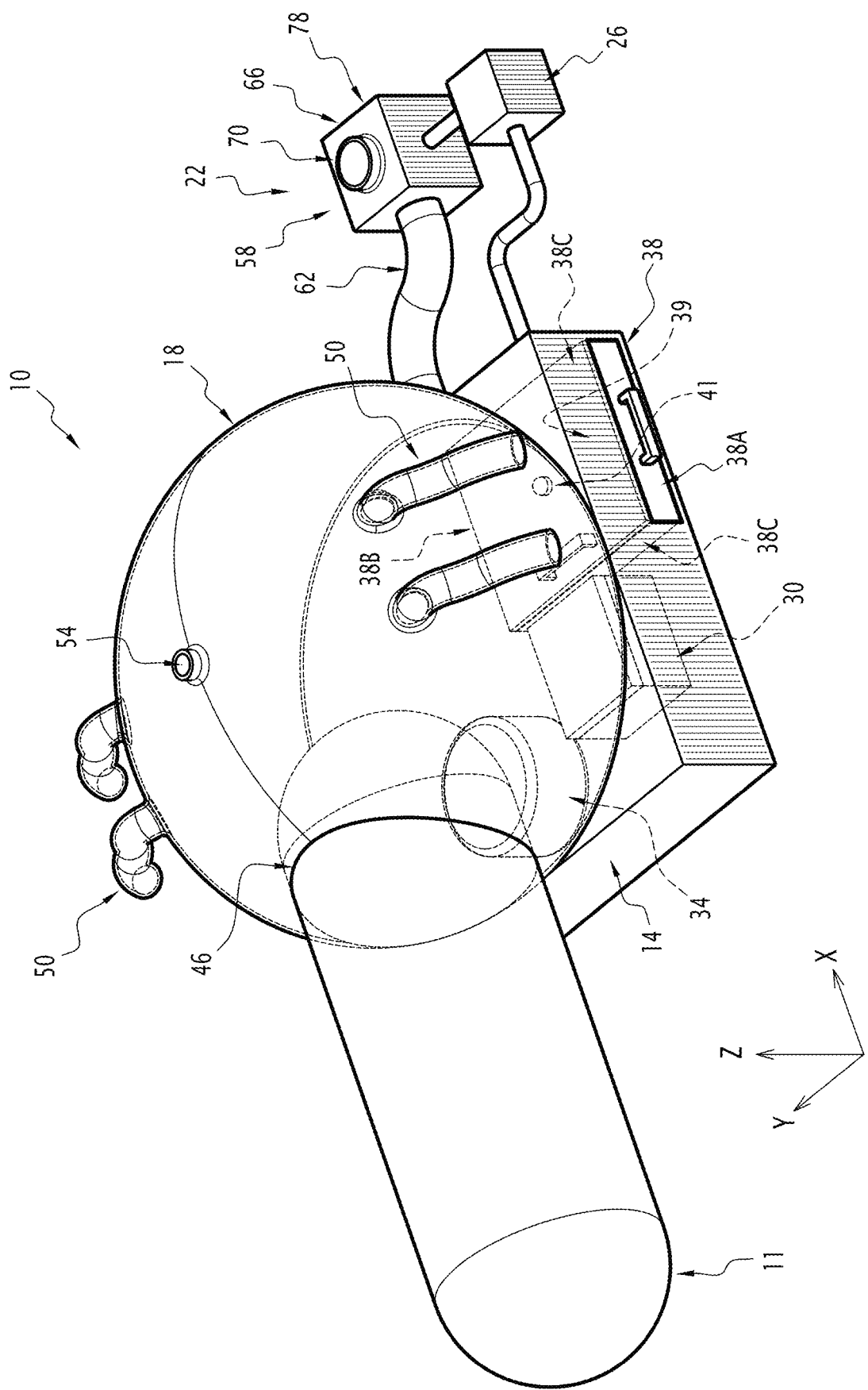

POD REPAIR UNIT

BACKGROUND OF THE INVENTION

Field of the Invention

The present invention relates to a repair unit for repairing a pod, in particular a laser designation pod.

A nacelle or pod is a container that is fitted under a carrier in order to carry on board various different devices such as, for example, cameras, infrared imagers or even laser designators.

The repair of the front sections of the pods, especially of the laser designation pods, is carried out in a white room.

A white room or clean room is, according to the ISO 14644-1 standard, a room or a series of rooms where the concentration of particles is controlled in order to minimise, in particular, the introduction, generation and retention of particles within the interior of the white room. Parameters such as the temperature, the moisture and the relative pressure may also be maintained at a specific level in a white room.

Description of the Related Art

An installation to be used for performing surgical interventions on a patient, in particular dental operations, is known from the document DE 851 240. The installation comprises a bubble attached on to a casing that delimits an interior space which is sealed against exterior contaminants. The surgeon performs the surgical operations in the interior space.

However, the installation described in the document DE 851 240 is not suitable for repairing a pod.

Moreover, many users of pods do not have white rooms available. In this case, the pod to be repaired has to be returned to the manufacturers facilities in order to be repaired in a white room.

Such a return is costly both in terms of money and time.

In order to compensate for the lengthy time periods related to returns and repairs of the pods, spare parts are sold by the manufacturers.

However, the cost of spare parts is very high because the front section of a pod is an expensive item.

There is therefore a need to be able to easily carry out repairs on pods and reduce the duration of repair of the pods.

BRIEF SUMMARY OF THE INVENTION

To this end the object of the invention relates to a repair unit for a pod, in particular for a laser designation pod, comprising:
 a transportable casing,
 a bubble attached on to the casing, the bubble having a retracted state and a deployed state, the bubble comprising an insertion opening for inserting a part of a pod and at least two projections forming through-passage tubes for the hands of an operator, each tube opening out into the bubble,
 a gas supply device that is capable of switching the bubble from the retracted state into the deployed state, the casing and the bubble delimiting an interior space that is sealed against exterior contaminants both in the retracted state and in the deployed state.

According to some specific embodiments, the repair unit comprises one or more of the following characteristic features, taken into consideration in isolation or in accordance with all technically possible combinations:
 the casing comprises an air lock drawer capable of enabling the introduction of elements into the casing without contaminating the interior space;
 the bubble is made out of a flexible and transparent material;
 each tube comprises elastics, the elastics being capable of tightly gripping the arm of an operator when the hands of the said operator are introduced into the bubble.
 there is an even number of tubes and each tube is positioned diametrically opposite to another tube of the bubble;
 the repair unit comprises a pressure switch connected on the one hand to the interior of the casing and on the other hand to the gas supply device, the pressure switch being capable of measuring the differential pressure within the interior of the bubble and of disabling the gas supply device when the differential pressure measured within the interior of the bubble is, in absolute terms, greater than or equal to a predetermined value;
 the gas supply device is a motorised fan blower with filter that is capable of generating an air flow, the particle concentration of which being controlled; and
 the gas supply device comprises one or more bottles of nitrogen that is/are capable of generating a flow of nitrogen, the particle concentration of which being controlled.

The object of the invention also relates to a repair method for repairing a pod that comprises the following steps:
 the provision of a repair unit of the aforementioned type,
 the provision of a pod to be repaired,
 the deployment of the bubble of the repair unit,
 the inserting of the pod to be repaired into the opening of the bubble,
 the introduction of the hands of an operator into two tubes of the bubble,
 the repairing of the pod to be repaired by the operator, and
 the deflating of the bubble.

According to one particular embodiment of the repair method for repairing a pod, the pod being such as has been previously described and the casing comprising an air lock drawer capable of enabling the introduction of elements into the casing without contaminating the interior space, the repair method previously described also comprises the following step:
 the introduction of elements into the casing by means of the air lock drawer.

The object of the invention also relates to a method for preparing a repair unit, the casing comprising a cover, that comprises the following steps:
 the provision of a casing in a white room,
 the provision of a bubble, having a deployed state and a retracted state, in the white room;
 the filling of the casing with the tools and spare parts,
 the attaching of the bubble in the retracted state on to the casing, and
 the positioning of the cover on the casing.

BRIEF DESCRIPTION OF THE DRAWINGS

The drawing FIGURE shows a repair unit 10 for repairing a pod and a pod 11 to be repaired.

DETAILED DESCRIPTION OF THE PREFERRED EMBODIMENTS

Other characteristic features and advantages of the invention will become apparent upon reading the description that follows of embodiments of the invention, provided purely by way of example and with reference being made to the only FIGURE that is a schematic representation of an example of a repair unit for repairing a pod according to the invention.

A repair unit 10 for repairing a pod and a pod 11 to be repaired are represented in the FIGURE.

The repair unit 10 is used in particular for repairing pods, in particular laser designation pods.

As is visible in the FIGURE, the repair unit 10 comprises a transportable casing 14, a bubble 18 that is attached on to the casing 14 delimiting with the casing 14 an interior space, a gas supply device 22 for supplying gas to the casing 14, as well as a control pressure switch 26 for controlling the gas supply device 22 and the casing 14.

Although not represented in the FIGURE, the repair unit 10 comprises, in addition, the technical documents made available to an operator.

The casing 14 is a container having a parallelepiped shaped form.

In the following sections of the description, a longitudinal direction X is defined which is represented in the FIGURE by an axis X, and that corresponds to the length of the casing 14. Also defined, in addition, is a first transverse direction, referred to as direction of elevation Z, which is perpendicular to the longitudinal direction X and represented in the FIGURE by an axis Z. Also defined, is a second transverse direction Y, which is perpendicular to the longitudinal direction X and to the first transverse direction Z. The second transverse direction Y is represented in the FIGURE by an axis Y.

The dimensions of the casing 14 are, for example, 50 cm along the longitudinal direction X, 50 cm along the first transverse direction Z and 50 cm along the second transverse direction Y. For reasons of convenience, the dimensions of the casing 14 in the FIGURE do not correspond to the actual dimensions of the casing 14.

The casing 14 comprises four side panels, a bottom and a removable cover (not shown). The term "interior of the casing" 14 is understood to refer to the space located within the casing 14 and delimited by the four lateral panels, the bottom and the cover of the casing 14. In a similar manner, the term "exterior of the casing" 14 is understood to refer to the space other than the interior space of the casing 14.

The volume of the interior of the casing 14 is reduced in a manner such that the casing 14 is easily transportable by an operator.

For example, the volume of the interior of the casing 14 is of the order of 0.125 m$^3$.

The casing 14 is, for example, made out of metal such as steel.

The casing 14 comprises tools 30, spare parts 34 and an air lock drawer 38.

The tools 30 may be used by an operator for repairing the pod 11. The term "tool", is understood to refer to a physical instrument that may be used by an operator, directly or by means of a machine in order to perform an action, for example a mechanical action.

The tools 30 present in the casing 14 are, for example, screwdrivers, pliers, screws, nuts, or bolts.

The spare parts 34 are suitable for replacing the worn out or damaged parts of the pod 11. The spare parts 34 are, for example, laser systems, electronic cards or any other spare parts that are useful to the maintenance operation.

The tools 30 and spare parts 34 present in the casing 14 have been inserted in advance, during the preparation of the repair unit 10, for the purposes of repairing the pod 11.

The nature of the tools 30 and the spare parts 34 may vary depending on the type of pod 11 considered, that is to say, based on the devices being transported by the pod 11. Such devices are, for example, cameras, infrared imagers, or even laser designators.

The nature of the tools 30 and the spare parts 34 vary, also, based on the operations to be performed on the pod 11 for the purposes of its repair. Such operations are, for example, operations related to replacement of worn out parts, changing of electric cables, changing of electronic cards, and maintenance operations.

The air lock drawer 38 is a rack or a compartment that is capable of sliding between the interior of the casing 14 and the exterior of the casing 14 by means of a handle. The air lock drawer 38 thus has multiple states: a closed state when the air lock drawer 38 is in its entirety within the interior of the casing 14, an open state when the air lock drawer 38 is to the maximum extent possible out of the interior of the casing 14 and an intermediate state between the open state and the closed state.

The air lock drawer 38 has a parallelepiped shaped form.

The dimensions of the air lock drawer 38 are, for example, of the order of 40 centimetres (cm) along the longitudinal direction X, of the order of 20 cm along the first transverse direction Z and of the order of 50 cm along the second transverse direction Y.

The air lock drawer 38 is capable of sliding through one of the lateral panels of the casing 14.

The air lock drawer 38 comprises a front panel 38A, a rear panel 38B, two lateral panels 38C, a bottom (not visible in the FIGURE), a hatch 39, a sweeping system (not shown in FIGURE) and an indicator light 41.

The front panel 38A of the air lock drawer 38 has a handle that is suitable to be gripped by an operator situated on the exterior casing 14 for causing the sliding of the air lock drawer 38. This handle is located on the exterior of the casing 14.

The back panel 38B of the air lock drawer 38 is made of a sealing material. For example, the rear panel 38B of the air lock drawer 38 is made of PMMA (abbreviation for Poly (methyl methacrylate)).

Such a rear panel 38B is capable of preventing the penetration of contaminants into the interior space formed by the casing 14 and the bubble 18.

The lateral panels 38C of the air lock drawer 38 are located along a direction perpendicularly intersecting the front panel 38A and the rear panel 38B.

The bottom of the air lock drawer 38 is capable of supporting the lateral panels 38C, the front panel 38A and the rear panel 38B of the casing 14.

The hatch 39 is a panel that closes the air lock drawer 38. The hatch 39 is capable of being raised or lowered at will by an operator.

The front panel 38A, the rear panel 38B, the two lateral panels 38C, the bottom and the hatch 39 define the interior of the air lock drawer 38.

The sweeping system is a system that is capable of producing a flow of gas and of drawing off (vacuuming) or sweeping the contaminants present in the air lock drawer 38 in a manner such that the concentration of the particles within the interior of the air lock drawer 38 is in conformity with class 6 or class 7 of the standard ISO 14644-1. The sweeping system is capable of diverting a part of the air flow suitable for inflating the bubble 18.

The indicator light 41 is a timer that is appropriate for indicating to an operator that the vacuuming or sweeping of contaminants has either been completed/terminated or is still in process. In the event of the vacuuming or sweeping of contaminants being completed/terminated, the operator may open the hatch 39 of the air lock drawer 38.

The indicator light 41 is fitted on to the top of the hatch 39 in contact with the interior of the casing 14.

The indicator light 41 is capable of flashing upon the closing of the air lock drawer 38. At the end of the sweeping process, the indicator light 41 is capable of passing into an unflashing steadily lit state, after a few minutes.

The bubble 18 is an enclosure made from a flexible and elastic material that has a thickness that is fine enough for it to be flexible and transparent but thick enough for it to withstand the drop of a screwdriver from a height of 2 metres and be resistant to break-out of a force of 50 kg exerted at the level of the sleeves. Such a material is, for example, latex or rubber. A transparent material, in particular allows an operator to easily view the contents of the bubble 18 and the casing 14.

The bubble 18 is attached on to the casing 14 on the side opposite to the bottom of the casing 14 and located in the plane formed by the longitudinal direction X and the second transverse direction Y. In particular, the bubble 18 is attached on to the internal part of the lateral panels of the casing 14. Thus the sealing of the bubble 18 is assured and the disassembly of the bubble 18 becomes possible. The bubble 18 is, for example, attached to the lateral panels of the casing 14 by means of screws, fastening seals or even metal plates or strips.

The bubble 18 presents a retracted state and a deployed state.

The term "interior of the bubble 18" is defined as the space located under the bubble 18 that is communicating with a part of the interior space of the casing 14. Conversely, the term "exterior of the bubble 18" refers to the space found on the outside of the bubble 18 and thus not communicating with the interior of the casing 14.

The term "interior surface of the bubble 18" is used to define the surface of the bubble 18 that is in contact with the interior of the bubble 18. The interior surface of the bubble 18 is a clean surface since the interior surface of the bubble 18 is not in contact with contaminants coming from on the exterior of the bubble 18. In similar fashion, the term "exterior surface of the bubble 18" is used to define the surface of the bubble 18 that is in contact with the exterior of the bubble 18. The exterior surface of the bubble 18 is the surface that is in contact with contaminants originating from the exterior of the bubble 18.

As described previously, the bubble 18 forms with the casing 14 an interior space. The term "interior space" is understood to refer to the space corresponding to the inside of the bubble 18 which is delimited, on the one hand, by the interior surface of the bubble 18 and, on the other hand, by the bottom and the parts of the four lateral panels of the casing 14 located under the bubble 18. In similar fashion, the term "exterior space" is understood to refer to the complementary space in complement to the interior space in the mathematical sense of the term.

The interior space formed by the casing 14 and the bubble 18 is sealed against external contaminants, regardless of the state, whether retracted or deployed, of the bubble 18. The term "sealed against external contaminants" is understood, in the context of the invention, to refer to the property of allowing little/no external contaminant penetration into the interior space.

Putting it another way, this means that less than 0.01% of the interior space in volume is occupied by external contaminants.

Preferably, the sealing is total, which is to say that no external contaminants have the ability to pass from the exterior space to the interior space.

The concentration of particles in the interior space formed by the casing 14 and the bubble 18 is controlled. For example, the concentration of particles in the interior space is similar to class 6 or class 7 of the ISO 14644-1 standard. The particles are, for example, dust particles of variable sizes, in particular in the micrometre range.

Similarly, the parameters such as pressure are maintained at a precise level in the interior space formed by the casing 14 and the bubble 18. The overpressure in the bubble 18 is a few PSI above ambient atmospheric pressure. "PSI", acronym for pound-force per square inch, refers to a unit of measure for stresses and pressures.

The interior space formed by the casing 14 and the bubble 18 is thus akin to a white room.

In the retracted state, the bubble 18 is capable of occupying a part of the interior of the casing 14 and the cover of the casing 14 is adapted to be disposed over the casing 14 in a manner so as to close the casing 14.

In the deployed state, the bubble 18 is adapted to be deployed towards the exterior of the casing 14. Such a deployed state is obtained by introduction of a gas into the casing 14.

When the bubble 18 is in the deployed state, it is no longer possible to position the cover of the casing 14 in its dedicated locational position over the casing 14.

The bubble 18 comprises an opening 46, at least two projections forming through-passage tubes 50 through which the hands of an operator may pass into the bubble 18 and a security pressure valve 54.

The opening 46 is of appropriate shape and size so as to be suitable for the inserting of a part of the pod 11 to be repaired, in particular for the inserting of a front section of the laser designation pod.

For example, the size of the opening 46 is comprised between 30 and 50 cm.

For example, the opening 46 has a circular or elliptical shaped form.

The at least two projections forming through-passage tubes 50 are made out of the same material as the bubble 18 and are attached to the bubble 18 in a manner so as to be non-detachable.

The tubes 50 are akin to sleeves fitted to the wrists of an operator.

The tubes 50 are located on the exterior of the bubble 18 on the side of the exterior surface of the bubble 18 and open out within the interior of the bubble 18.

The tubes 50 are disposed on both sides of the bubble 18.

As illustrated in the FIGURE, the bubble 18 comprises four tubes 50, that is, an even number of tubes 50. Each tube 50 is disposed on the bubble 18 in such a manner as to be diametrically opposite to one of the three other tubes 50. Such a number of tubes 50 makes it possible for an operator to carry out repair operations at different locations on the pod 11 to be repaired in the bubble 18.

According to another example, the bubble has more than four tubes 50 or even an odd number of tubes 50.

The tubes 50 comprise elastic elements (not represented) in a manner such that when the bubble 18 is deployed, a tube 50 is capable of enabling the introduction of a hand of an operator into the bubble 18 while being capable of gripping in an elastic manner the arm of the operator on which the hand is attached. The tubes 50 are each equipped with a stopper. The stopper of each tube 50 is capable of preventing the escape of gas out of the bubble 18, when the tube 50 is not being used by an operator.

The security pressure valve 54 is also called safety relief valve. The term "security pressure valve" is understood to refer to an overpressure protection device for protecting against overpressure in an assembly subjected to pressure.

The security pressure valve 54 is suitable to be installed in multiple locations at the level of the exterior surface of the bubble 18. For example, the security pressure valve 54 is attached on to one of the lateral panels of the casing 14. The security pressure valve 54 is in contact with the interior and the exterior of the bubble 18.

The security pressure valve 54 is capable of opening up and letting the gas contained in the bubble 18 escape when the value of the pressure within the interior of the bubble 18 exceeds a predetermined pressure value.

The predetermined pressure value for opening the valve 54 is equal to twice the rated operating pressure.

Such a security pressure valve 54 thus makes it possible to ensure the bubble 18 is secure against excess pressure with the associated risk of causing the bursting of the bubble of 18.

The gas supply device 22 makes it possible to convey a gas flow into the interior space formed by the casing 14 and the bubble 18. Such a gas supply device 22 is capable of deploying the bubble 18.

As illustrated in FIG. 1, the gas supply device 22 is located on the exterior of the bubble 18 and the casing 14.

However, it is also possible for the gas supply device 22 to be located within the interior of the casing 14. Such a positioning of the gas supply device 22 makes it possible to limit the number of carry cases for transportation during the transporting of the repair unit 10.

The gas conveyed by the gas supply device 22 is a "clean" gas, that is to say that the particulate concentration of this gas is in conformity with class 6 or class 7 of the ISO 14644-1 standard.

The gas contained in the gas supply device 22 is, for example, air. Preferably, the gas contained in the gas supply device 22 is nitrogen.

In a first embodiment, the gas supply device 22 comprises a motorised fan blower with filter 58 and one connecting pipe 62 for connecting the gas supply device 22 to the casing 14.

The motorised fan blower with filter 58 is capable of collecting the ambient air found on the exterior of the bubble 18, filtering it and injecting the filtered air into the interior space formed by the casing 14 and the bubble 18.

The motorised fan blower with filter 58 is capable of generating a flow of air the particulate concentration of which is controlled.

The motorised fan blower with filter 58 comprises a fan 66 coupled with a filter 70 and a motor 78.

The fan 66 enables the generation of a wind or an artificial air current from the ambient air.

The filter 70 provides the ability to filter particles such as dust particles present in the air in a manner such that the air injected by the gas supply device 22 into the interior space formed by the casing 14 and the bubble 18 is in conformity with class 6 or class 7 of the ISO 14644-1 standard.

The motor 78 makes it possible to provide energy for setting the fan 66 in operation.

The pipe 62 enables the conveying of the air coming from the motorised fan blower with filter 58 to the casing 14.

In a second embodiment, the gas supply device 22 comprises pressurised canisters, not represented in the FIGURE. Such pressurised canisters contain a pressurised gas such as nitrogen and are capable of supplying the casing 14, and thus the interior space formed by the casing 14 and the bubble 18 with pressurised gas.

The pressurised canisters are capable of generating a gas, such as nitrogen, with the particulate concentration thereof being controlled. For example, the gas generated by the pressurised canisters is in conformity with class 6 or class 7 of the ISO 14644-1 standard.

The pressure switch 26 is connected, on the one hand, to the gas supply device 22 and, on the other hand, to the casing 14.

The pressure switch 26 is a differential pressure switch. Such a differential pressure switch 26 is able to measure differential pressure, that is to say, a pressure difference between two pressures. The differential pressure switch 26 is in particular, capable of measuring positive or negative differential pressures.

The differential pressure switch 26 is capable of controlling the differential pressure within the interior space formed by the casing 14 and the bubble 18. In particular, when the differential pressure in the interior space formed by the casing 14 and the bubble 18 is in absolute value terms greater than or equal to a predetermined value, the differential pressure switch 26 is configured so as to disable the gas supply device 22.

For example, the predetermined value in absolute value of the differential pressure is of the order of a few PSI.

The technical documentation comprises, for example, a quick start up and user instruction manual for the repair unit 10 or indeed technical data sheets on the different parts present on a pod.

For example, the pod 11 to be repaired is a laser designation pod.

The pod 11 to be repaired comprises, for example, components that have broken down, are damaged, or not be properly adjusted or misaligned. Such components may be in particular electronic cards, electric cables, cameras, or even laser systems.

The operation of the repair unit 10 according to the invention will now be described.

Initially, an operator opens the cover of the casing 14. The operator finds the bubble 18 of the repair unit 10 in the retracted state. The tubes 50 are compressed on the bubble 18.

When an operator wishes to use the repair unit 10 with a view to repairing the pod 11, for example, the front section of a laser designation pod, the operator turns on the gas supply device 22.

The gas, for example nitrogen, is conveyed into the interior space formed by the casing 14 and the bubble 18 and enables the deployment of the bubble 18.

Thereafter, the operator carefully cleans the part of the pod 11 to be repaired. Then, the operator inserts the part of the pod 11 to be repaired into the opening 46 of the bubble 18.

Then, the operator introduces their hands, followed by their arms into two tubes 50. The tubes 50 are fitted with elastic elements in a manner so as to tightly grip the arms of the operator when their hands are present in the bubble 18.

Then, the operator carries out the repair on the pod 11 in the bubble 18 by means, in particular, of tools 30 and spare parts 34.

Optionally, it is possible for the operator to add a tool or a spare part that is not present initially in the casing 14. In order to do this, the operator uses the air lock drawer 38. The operator introduces, for example, a tool 30 such as a screwdriver in the air lock drawer 38 and closes the air lock drawer 38 again such that the tool 30 is introduced into the casing 14 without contaminating the particle environment of the interior space formed by the casing 14 and the bubble 18.

Then, the operator removes the part of the pod 11 that has been repaired.

Finally, the operator deflates bubble 18 in a manner such that the bubble 18 is again in the retracted state. The bubble 18 is deflated, on the one hand, by withdrawal of the part of the pod 11 and, on the other hand, by the pressures exerted by the operator on the exterior surface of the bubble 18. The opening 46 through which the pod 11 to be repaired is introduced, is indeed, large enough to allow for the easy deflation of the bubble 18.

Thus, once deployed, the bubble 18 is maintained under pressure by the gas supply device 22 in a manner so as to prevent the entry of polluting particles, such as dust particles, into the bubble 18.

Thus, such a repair unit 10 provides the ability to obtain a transportable or movable white room both on the ground, as well as at sea, or in the air.

The moving of an operator and the repair unit 10 on a site where a pod to be repaired is present makes it possible to save time and reduce the costs as compared to the returning of the pod to be repaired to the facilities of the supplier thereof.

Thus, the repair unit 10, in particular the bubble 18, forms a flexible support means that is deployable and makes possible the intervention by an operator on a pod in a confined and controlled environment.

Such a repair unit 10 offers the choice to the user, in particular by way of the choice of the gas supply device 22, of repairing a pod under different gas environments, comprising, for example, air or nitrogen.

Nitrogen presents the advantage of not oxidising the metal parts, unlike in the case of air. Thus, since only the hands of an operator enter into the bubble 18, nitrogen is usable directly instead of air in order to deploy and maintain the bubble 18 under pressure.

However, unlike a white room, such a repair unit 10 presents the advantage of not being some voluminous and is thus easily transportable. Thus, the repair unit 10 is able to be transported to multiple locations, by land, as well as by sea, or air.

In addition, unlike a white room, such a repair unit 10 is easy to use, insofar as one single operator is sufficient to deploy and use it for repairing a pod.

In addition, in contrast to a white room, the repair unit 10 remains a confined environment insofar as only the hands of the operator enter into the bubble 18. Indeed, the operator constitutes the main pollutant on account of the water vapour, hair, or indeed even the dust that s/he is likely to bring into the white room. Thus, with such a repair unit 10, it does not entail providing for a full day of sweeping in order to clean the white room after each use.

Finally, in contrast to a white room, the repair unit 10 makes it possible to do away with the multiple entries and exits of people to and from the white room and to not have limitations as to the number of persons in the white room during the operation.

Thus, the repair unit 10 offers the advantages of a gloved box, insofar as only the hands of the operator enter into the bubble 18. The term "gloved box" is understood to refer to a sealed enclosure which allows for performing manipulations within a particular environment. The gloves, for example, reaching up to the shoulders are attached to one of the walls of the gloved box and allow an operator to access the interior of the gloved box without putting an end to the containment. A gloved box is generally fabricated out of a rigid material, for example, plexiglas.

However, in contrast to a conventional gloved box, the operator using the repair unit 10 does not have gloves. This helps in facilitating the handling and manipulation of tools 30, for example the handling of screws or other tools that require precision in movements.

In addition, in contrast to a conventional gloved box, the repair unit 10 is flexible thanks to the materials used for the fabrication of the bubble 18. The flexibility provided by such materials offers the operator a significant degree of freedom of movement. Such freedom of movement is impossible to obtain while working in a rigid gloved box on an item that is the size of a front section of a laser designation pod in particular.

In addition, the tools 30 and spare parts 34 present in the casing 14 are not contaminated by the exterior or by the operator.

In addition, the air lock drawer 38 provides the ability to have items such as tools or spare parts, enter into the interior space formed by the casing 14 and the bubble 18 without contaminating the cleanliness of the interior space formed by the casing 14 and the bubble 18, that is to say, without altering the concentration of particles or the other parameters such pressure of the interior space formed by the casing 14 and the bubble 18.

Thus, the repair unit 10 is easy to put in operation and makes it possible to minimise the duration of repair of the pods.

In addition, the repair unit 10 is easy to prepare. The following preparation method in particular may be envisaged in order to prepare a repair unit 10 according to the invention.

The preparation method comprises an initial step of provision of a casing 14 in an environment where the particulate concentration is controlled. Such an environment is, for example, a white room wherein the particulate concentration is in conformity with class 6 or class 7 of the ISO 14644-1 standard.

The preparation method subsequently comprises a step of provision of a bubble 18, having a deployed state and a retracted state, in the environment.

Thereafter, the preparation method comprises a step of filling of the casing 14 with the tools 30 and/or spare parts 34 that are suitable for a particular given repair operation and for a given type of pod.

Then, the preparation method comprises a step of attaching of the bubble 18 in the retracted state on to the casing 14. This step of attaching, for example, is carried out by means of screws, fastening strips or plates or even fastening seals.

The preparation method comprises, finally, a step of positioning of the cover over the casing 14.

The repair unit 10 is ready to be sent on to a site for the purposes of repairing a pod.

The bubble 18 is only deployed on the site where the pod to be repaired is found.

The presence of elastics makes it possible to tightly grip the arms of the operator when the hands of the operator are introduced into the bubble 18. This makes it possible to improve the process of maintaining the arms of the operator in place in the tubes 50 and, thus, to facilitate the actions of the operator in the bubble 18. The repairing of the pod 11 is thus made easier.

The invention claimed is:

1. A repair unit for a pod, comprising:
a transportable casing,
a bubble attached on to the casing, the bubble having a retracted state and a deployed state, the bubble comprising an insertion opening for inserting a part of the pod and at least two projections forming through-passage tubes for hands of an operator, each tube opening out into the bubble,
a gas supply device capable of switching the bubble from the retracted state into the deployed state,
the casing and the bubble delimiting an interior space that is sealed against exterior contaminants both in the retracted state and in the deployed state, each tube comprising elastics, the elastics being capable of tightly gripping arms of the operator when the hands of the said operator are introduced into the bubble,
wherein the casing comprises an air lock drawer capable of enabling the introduction of elements into the casing without contaminating the interior space.

2. A repair unit according to claim 1, wherein the bubble is made out of a flexible and transparent material.

3. A repair unit according to claim 1, wherein there is an even number of tubes and each tube is positioned diametrically opposite to another tube of the bubble.

4. The repair unit according to claim 1, wherein the casing is sized to contain a laser designation pod.

5. The repair unit according to claim 1, wherein the pod is a laser designation pod.

6. A repair unit for a pod, comprising:
a transportable casing,
a bubble attached on to the casing, the bubble having a retracted state and a deployed state, the bubble comprising an insertion opening for inserting a part of the pod and at least two projections forming through-passage tubes for hands of an operator, each tube opening out into the bubble,
a gas supply device capable of switching the bubble from the retracted state into the deployed state,
the casing and the bubble delimiting an interior space that is sealed against exterior contaminants both in the retracted state and in the deployed state, each tube comprising elastics, the elastics being capable of tightly gripping arms of the operator when the hands of the said operator are introduced into the bubble, and
a pressure switch connected to an interior of the casing and to the gas supply device, the pressure switch being capable of measuring a differential pressure within an interior of the bubble and of disabling the gas supply device when the differential pressure measured within the interior of the bubble is, in absolute terms, greater than or equal to a predetermined value.

7. The repair unit according to claim 6, further comprising the pressure switch is configured to maintain the interior of the bubble, in absolute terms, greater than ambient atmospheric pressure so that the interior of the bubble is in an overpressure condition with respect to the ambient atmospheric pressure.

8. The repair unit according to claim 6, further comprising the pressure switch is configured to control the gas supply device to maintain the interior of the bubble in an overpressure condition with respect to the ambient atmospheric pressure.

9. A repair unit according to claim 1, wherein, the gas supply device is a motorised fan blower with filter that is capable of generating an air flow, a particle concentration of which being controlled.

10. A repair unit for a pod, comprising:
a transportable casing,
a bubble attached on to the casing, the bubble having a retracted state and a deployed state, the bubble comprising an insertion opening for inserting a part of the pod and at least two projections forming through-passage tubes for hands of an operator, each tube opening out into the bubble,
a gas supply device capable of switching the bubble from the retracted state into the deployed state,
the casing and the bubble delimiting an interior space that is sealed against exterior contaminants both in the retracted state and in the deployed state, each tube comprising elastics, the elastics being capable of tightly gripping arms of the operator when the hands of the said operator are introduced into the bubble,
wherein the gas supply device comprises one or more bottles of nitrogen capable of generating a flow of nitrogen, a particle concentration of which being controlled.

11. A method for repairing a pod comprising the following steps:
providing a repair unit according to claim 1,
providing the pod to be repaired,
deploying the bubble of the repair unit,
introducing the pod to be repaired into the opening of the bubble,
introducing the hands of the operator into each of the two tubes of the bubble,
repairing the pod to be repaired by the operator, and
deflating the bubble.

12. The method of claim 11, further comprising, during said repairing step, maintain an interior of the bubble in an overpressure condition with respect to the ambient atmospheric pressure.

13. A method for repairing a pod according to claim 11, wherein the casing of the repair unit comprises the air lock drawer capable of enabling the introduction of elements into the casing without contaminating the interior space, with the method comprising the following step:
introducing the elements into the casing by means of the air lock drawer.

14. A method for preparing a repair unit according to claim 1, the casing comprising a cover, that comprises the following steps:
providing the casing in a white room,
providing the bubble, having the deployed state and the retracted state, in the white room,
filling the casing with tools and spare parts,
attaching the bubble in the retracted state on to the casing, and
positioning the cover on the casing.

* * * * *